United States Patent [19]

Brauer et al.

[11] Patent Number: 4,742,112

[45] Date of Patent: May 3, 1988

[54] RICINOLEATE MODIFIED HYDROCARBON POLYOLS

[75] Inventors: Melvin Brauer, East Brunswick; William J. Downey, Linden, both of N.J.

[73] Assignee: CasChem, Inc., Bayonne, N.J.

[21] Appl. No.: 6,415

[22] Filed: Jan. 23, 1987

[51] Int. Cl.$^4$ ............................................. C08G 18/28
[52] U.S. Cl. ............................... 524/705; 252/182.18; 252/182.24; 252/182.26; 252/182.27; 524/773; 524/774; 524/775; 528/49; 528/74.5; 528/75
[58] Field of Search ............... 524/705, 773, 774, 775; 252/182; 528/49, 74.5, 75

[56] References Cited

U.S. PATENT DOCUMENTS 4,532,142  8/1985  Brauer et al. ..................... 528/75
4,603,188  8/1986  Kusakawa et al. ................ 528/60

Primary Examiner—Maurice J. Welsh
Attorney, Agent, or Firm—Pennie & Edmonds

[57] ABSTRACT

Polyol mixtures having about 10 to 60 weight percent of a ricinoleate compound and 90 to 40 weight percent of a $C_2$–$C_6$ hydrocarbon polymer having at least one hydroxyl group. Polyurethane compositions comprising the reaction product of this polyol mixture with an organic isocyanate compound. These compositions may optionally include certain extender compounds. Also, a method for lowering the viscosity of $C_2$–$C_6$ hydrocarbon polymer having at least one hydroxyl group by adding a ricinoleate compound thereto.

36 Claims, No Drawings

RICINOLEATE MODIFIED HYDROCARBON POLYOLS

TECHNICAL FIELD

The invention relates to ricinoleate modified hydrocarbon polymer polyols. Specifically, the invention contemplates the use of ricinoleate modified polyols, alone or blended with other polyols, for reaction with organic isocyanate compounds to form new polyurethane compositions.

BACKGROUND ART

There are numerous ways to modify polyols to improve the properties of the resultant polyurethane compositions. U.S. Pat. No. 4,535,142 generally discusses some of these methods and describes the use of diricinoleate diols for reducing the viscosity and increasing the solids content of certain polyurethane coating compositions.

Hydrocarbon polymer polyols, as defined in this application, are generally not used in coating compositions because they provide unsuitable mechanical and weathering properties as well as poor adhesion to most commonly used substrates. Furthermore, hydrocarbon polymer polyols are generally highly viscous and substantially incompatible with many low viscosity polyols that could be blended or mixed therewith to reduce their viscosity. Thus, the polyol mixture becomes cloudy, separates or forms a two-phase solution which is not suitable for further reaction as a casting or potting formulation.

A limited number of specific polyether polyols are compatible with certain hydrocarbon polymer polyols, however, blends of these polyols result in a mixture having inferior mechanical properties or much higher viscosities than can be obtained from the unmodified hydrocarbon polymer polyol alone. Therefore, it is difficult to use such mixtures in casting or potting formulations. While it is also possible to use various extender compounds such as plasticizers, oils and the like to obtain low viscosity hydrocarbon polymer polyol mixtures, this low viscosity property is achieved at the expense of mechanical properties and hydrolytic stability of the formulation.

It has now been found that the properties of hydrocarbon polymer polyols can be modified by mixing those polyols with any of a number of ricinoleate compounds having at least one and preferably two or more hydroxyl groups per molecule. These ricinoleate compounds possess very low viscosities and allow modification of the final properties of the overall polyurethane composition, while not detracting from the properties available from the hydrocarbon polyols. Thus, the substitution of these compounds for a portion of the hydrocarbon polymer polyol yields compositions having improved mechanical properties, solvent resistance, and flexibility, while maintaining the electrical properties at an acceptable level.

SUMMARY OF THE INVENTION

The invention relates to a polyol mixture of a ricinoleate compound having at least two hydroxyl groups per molecule and a $C_2$ to $C_6$ hydrocarbon polymer, preferably, polybutadiene, having at least one hydroxyl group. The amount of ricinoleate compound should be sufficient to lower the viscosity of the hydrocarbon polymer and increase the mechanical properties of polyurethane compositions which utilize such polyol mixtures while maintaining acceptable electrical properties in such compositions. Preferably, the amount of ricinoleate compound ranges from about 10 to 60 weight percent of the mixture with the most favorable results being obtained when 20 to 40 weight percent of the mixture is the ricinoleate compound.

The invention also relates to a polyurethane composition comprising the reaction product of a polyol mixture with an organic isocyanate compound. The polyol mixture comprises from about 10 to 60 weight percent of at least one ricinoleate compound having at least two hydroxyl groups per molecule and from about 90 to 40 weight percent of a $C_2$ to $C_6$ hydrocarbon polymer having at least one hydroxyl group. In this composition, the ratio of NCO groups in the isocyanate compound to the OH groups of the polyol mixture ranges from about 0.9 to 1.8, and the organic isocyanate compound is an aliphatic, cycloaliphatic or aromatic polyisocyanate, preferably polymethylene polyphenyl diisocyanate or p,p' diphenyl methane diisocyanate.

Useful synthetic ricinoleate compounds according to the invention include the diricinoleates of aliphatic diols of between about 2 and 12 carbon atoms, cycloaliphatic diols, or aromatic diols. Preferable ricinoleate compounds include pentaerythritol triricinoleate; pentaerythritol tetraricinoleate; or a diricinoleate of N,N-bis (2-hydroxy propyl) aniline; N,N,N,N-tetrakis (2-hydroxy propyl) ethylene diamine; 1,4 cyclo hexane dimethanol; ethylene glycol; diethylene glycol; ethoxylated bisphenol A; 1,4 butanediol; 1,3 propanediol; 1,6 hexane diol; and 1,3 neopentyl glycol; or N,N,N,N-tetrakis (2-hydroxy propyl) ethylene diamine monoricinoleate. The ricinoleate compound should be present in an amount between 10 to 60, and preferably 20 and 40 weight percent, with the hydrocarbon polymer polyol comprising between about 90 and 40, or 80 and 60 weight percent, respectively.

These polyurethane compositions may also include an extender compound. Such extended polyurethane compositions comprise the reaction product of a polyol mixture and an organic isocyanate compound in the presence of an extender compound which is substantially non-reactive with the polyol mixture or isocyanate compounds. Again, the polyol mixture comprises from about 10 to 60 weight percent of at least one ricinoleate compound having at least two hydroxyl groups per molecule and from about 90 to 40 weight percent of a $C_2$ to $C_6$ hydrocarbon polymer having at least one hydroxyl group.

In one embodiment of the invention, the reaction product is present in an amount of about 10 to 90 weight percent and the extender compound is present in an amount of between 90 and 10 weight percent. The extender may be a liquid ester compound; a liquid cyclic olefin; a polyalphaolefin; a mineral oil; a vegetable oil; or mixtures thereof. Preferred liquid esters include adipate, phthalate, glutarate, sebacate, fumarate, ricinoleate or trimellitate esters.

For compatibility with cable greases, a preferred extender compound includes a liquid ester or vegetable oil having a total solubility parameter of between about 9.1 and 9.7 or between about 8.3 and 8.9. Preferred grease compatible extenders include glyceryl tri (acetyl ricinoleate), linseed oil, corn oil, soybean oil, ditridecyl adipate, diundecyl phthalate, diisodecyl phthalate, trioctyl trimellitate or dibutyl phthalate.

In an alternate embodiment, reenterable formulations are made wherein the extender compound is present in an amount of between about 50 and 80 weight percent with the reaction product being present in an amount of between about 20 and 50 weight percent.

The invention also relates to a method for lowering the viscosity of a $C_2$–$C_6$ hydrocarbon polymer having at least one hydroxyl group which comprises adding to the polymer at least one ricinoleate compound having at least two hydroxyl groups per molecule to form a low viscosity polyol mixture. Such low viscosity mixtures can then be cured with isocyanates or other compounds to form coating, casting or potting materials, as well as general polyurethane elastomers.

DESCRIPTION OF THE PREFERRED EMBODIMENTS

One object of the invention is to provide ricinoleate modified hydrocarbon polyols. These polyols can then be reacted with polyisocyanates to form improved polyurethane compositions.

The term "hydrocarbon polymer polyol" is used to mean any polymeric $C_2$ to $C_6$ straight or branched chain aliphatic hydrocarbon which includes at least one hydroxyl group. Preferred compounds include hydroxyl terminated $C_4$ polymers. These hydroxyl terminated elastomers, and particularly polybutadiene or polyisoprene, have been utilized to form various polyurethane compositions. These polyols can be modified by substituting a ricinoleate compound for a portion of the polyol to form low viscosity polyol mixtures capable of providing improved properties in various end use formulations.

The hydrocarbon polymer polyols, exemplified by Arco's PolyBD, react readily with polyisocyanates at room temperature to form solid, rubber-like elastomers. While the cured elastomer is technically a polyurethane, the non-polar hydrocarbon polymer backbone imparts important properties to the formulation. Since water absorption is essentially eliminated, the formulations possess excellent hydrolytic stability and low moisture permeability. Electrical insulation properties are also excellent. In addition, the glass transition temperature for typical formulations is minus 50° F. or lower, thus enabling these formulations to be used in low temperature applications. Since elongation properties are retained at low temperatures, these formulations possess excellent thermal cycling and low embedment stress characteristics.

These properties provide significant advantages when these formulations are used as adhesives or sealants, or as potting or encapsulating compounds for electrical components. A combination of ease of handling, superior insulating ability, low exotherm, good low temperature properties and stability in hot, humid environments provides suitable properties for a wide range of other applications for these formulations, including as general purpose polyurethane compositions.

The term "ricinoleate compounds" is used to designate compounds having one or more ricinoleate moieties in its structure and two or more hydroxyl groups. Also, ricinoleate compounds, as defined in this invention, refer to synthetic ester derivatives of rinicinoleic acid, and would not include the naturally occurring glycerides. Since castor oil is a naturally occurring triglyceride principally of ricinoleic acid, it would not satisfy the definition of ricinoleate compounds are used herein.

Furthermore, in accordance with the teachings of the present invention, the ricinoleate compounds encompassed by the claims would be compatible with the hydrocarbon polymer polyols throughout the specified ranges.

A preferred group of synthetic ricinoleate compounds are diricinoleate diols. These diols can be prepared from an aliphatic diol of between about 2 and 12 carbon atoms, a cycloaliphatic diol, or aromatic diol, or mixtures thereof. The following compounds have been found to be particularly advantageous for use in these polyurethane compositions of the invention: diricinoleate derivatives of N,N-bis(2 hydroxy propyl) aniline, 1, 4 cyclo hexane dimethanol; ethylene glycol; diethylene glycol; ethoxylated bisphenol A; 1, 4 butanediol; 1, 3 propanediol; 1, 6 hexane diol; and 1, 3 neopentyl glycol.

Other advantageous ricinoleates include various tri- and tetra- ricinoleate compounds such as pentaerythitol triricinoleate; pentaerythitol tetraricinoleate; N,N,N,N-tetrakis (2-hydroxy propyl) ethylene diamine diricinoleate; or N,N,N,N-tetrakis (2-hydroxy propyl) ethylene diamine monoricinoleate.

Practically any isocyanate or polyisocyanate compound can be used in these compositions, depending upon the properties desired for the final polyurethane composition. Thus, the term "organic isocyanate compound" will be used to designate this component.

In these compositions, the ricinoleate compound comprises between 10 and 60 weight percent of the hydroxyl bearing component, with the hydrocarbon polymer polyol accounting for about 90 and 40 weight percent. The most preferred hydroxyl bearing component mixtures include from about 20 to 40 weight percent of the ricinoleate compound and from about 60 to 80 weight percent of the hydrocarbon polymer polyol. For certain polyols, however, higher amounts of ricinoleate compounds as described hereinbelow may be advantageous.

This hydroxyl bearing component is then reacted with an organic isocyanate compound to achieve the polyurethane compositions of the invention. Such compositions can be used as sealants, adhesives, waterproofing membranes, casting, potting, or encapsulating compounds, or general purpose elastomers. When used as adhesives, these compositions provide good bonding strength to metals, plastics and ceramics, including glass.

Typical formulations include separate A and B components. The A compound is the polyol mixture with optional additives such as extenders, fillers, tackifiers, adhesion promoters, pigments and the like. The B component is the isocyanate compound along with other optional additives. A prepolymer, formed by the reaction of the polyol mixture with the isocyanate compound, can be used as the B component along with or instead of the isocyante compound. The curing time of the A/B mixture can be controlled over a wide range and is regulated by temperature and/or use and amount of catalyst.

In order to optimize these polyurethane compositions, it is necessary to properly choose the organic isocyanate compound which will be used to react with the ricinoleate modified hydrocarbon polymer polyol. The selection is based upon consideration of the properties desired for the end use application. One skilled in the art should be familiar with such compounds and would be capable of making this selection.

Similarly, one skilled in the art should be capable of choosing the desired hydrocarbon polymer polyol and an organic isocyanate compound to obtain a particular polyurethane to meet or exceed the minimum acceptance criteria for the desired application. The performance of these known compositions can be modified and improved by substituting a ricinoleate compound for a portion of the known hydrocarbon polymer polyol. The amount of solvent needed, if any, for each composition can then be easily determined by routine experimentation. For most applications, the solvent content of the compositions of this invention will be much lower than the corresponding polyols, and generally not exceed about 33 weight percent. However, one skilled in the art can formulate an optimum formulation to meet the requirements of the desired end use or application for these compositions.

The hydroxyl bearing homopolymers of dienes or hydroxyl bearing copolymers of dienes are prepared from disubstituted 1,3-dienes of between 2 and 12 carbon atoms. Preferably, the diene has up to about 6 carbon atoms and the substituents in the 2- and/or 3-position may be hydrogen, alkyl groups having about 1 to about 4 carbon atoms, substituted aryl, unsubstituted aryl, halogen, and the like. Typical of such dienes are 1,3-butadiene, isoprene, chloroprene, 2-cyano-1,3-butadiene, 2,3-dimethyl-1,2-butadiene, and the like. The preferred dienes are 1,3-butadiene and isoprene. Also, any of wide variety of copolymers may be used.

Among the preferred hydrocarbon polyol polymers which are useful according to the invention are those based on isoprene, butylene, or polybutadiene. The polybutadiene based polyols are liquids that are founded on hydroxyl terminated liquid butadiene homopolymers and hydroxyl terminated butadiene copolymers. One class of butadiene based polyol copolymer has the approximate structure:

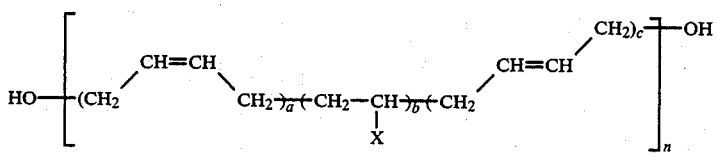

wherein:
X is H, alkyl, alkenyl, or $C_6H_5$
a=0.2 to 0.9
b=0.1 to 0.9
c=0.2 to 0.9
n=40 to 90.

When X is $C_6H_5$, a=0.15, b=0.25, C=0.45 and n=50–65, properties of such hydroxyl terminated polybutadiene-styrene copolymers are:

| | |
|---|---|
| Butadiene = 75% | Styrene = 25% |
| Viscosity 225 poise (25° C.) | OH content 0.65 meg/gm |
| Moisture = 0.05 wt. % | Iodine No. = 335 |

This class of polymers is available from the Arco Chemical Co. under the trademark POLY-BD.

Preferred ricinoleate compounds include diricinoleate compounds prepared from aliphatic diols ranging in chain length from about 2–6 carbon atoms. These compounds can be prepared by a variety of synthetic routes familiar to one skilled in the art. It is also possible to prepare diricinoleate diols from cyclo aliphatic diols such as 1,4 cyclo hexane dimethanol, as well as from aromatic diols such as N, N-bis (2-hydroxy proply) aniline, propoxylated and ethoxylated phenols and polyphenols, propoxylated and ethoxylated bisphenol A, along with mixtures thereof. Other diricinoleate diols may be prepared from a wide variety of diols which differ in structure from the aliphatic diols described above. These diricinoletate diols represent between about 10 to 60 percent by weight and preferably between 20 and 40 percent by weight of the hydroxyl bearing component of the composition, with hydrocarbon polymer polyol consituting the remainder.

Suitable organic isocyanate compounds include those having an average NCO functionality of at least 2 such as, for example, the polymethylene polyphenyl isocyanates, NCO containing prepolymers such as the reaction products of an excess of an organic diisocyanate with polyhydroxyl containing compounds having from 3 to about 8 OH groups per molecule such as, for example, glycerine, trimethylolpropane, pentaerythritol, sorbitol, sucrose, mixtures thereof and mixture with dihydroxyl containing compounds such that the average hydroxyl functionality of the prepolymer is at least about 2. It is preferred that the organic polyisocyanate be liquid, however, in the event that it is a solid or semisolid or of a relatively high viscosity such that blending with the other components would be difficult or inconvenient, they may be prepared in a suitable solvent.

Suitable organic diisocyantes which are employed in the preparation of the prepolymers include for example, 2,4-toluene-diisocyanate, 2,6-toluene diisocyanate, hexamethylene diisocyanate, p,p' diphenylmethanediisocyanate, p-phenylenediisocyanate, hydrogenated methylene diphenyldiisocyanate, naphthalene diisocyanate, dianisidine diisocyanate, mixtures of one or more of these polyisocyanates and the like.

For certain applications, such as buried telephone cable splice encapsulation, it may be desirable to use an extender compound to enable soft gel compositions to be obtained. Such extenders include any low viscosity organic liquid which is substantially non-reactive with the isocyanate compound. Specifically, liquid esters, liquid cyclic or polyalphaolefins, mineral oils or vegetable oils can be used as extenders, alone or in various combinations.

The ester plasticizing agents which are suitable include any saturated or unsaturated aliphatic, cycloaliphatic or aromatic aliphatic compound which is substantially non-reactive with the polyurethane components. Specifically, ricinoleates, phthalates, glutarates, fumarates, sebacates, adipates, citrates, trimellitates and mixtures thereof are preferred.

The cyclic olefin extenders of the present invention are characterized by excellent compatibility with the polyurethanes, a broad viscosity range, good electrical properties compatibility with plastic components. Specific cyclic olefins include dipentene, pinene, dicyclopentadiene, and polycyclopentadiene, all of which are commercially available. The cyclic olefins consist of at least one 5 or 6 membered ring with at least one unsaturated bond. In addition to this one unsaturated ring, the compound may include saturated carbon chains, unsaturated carbon chains, saturated carbon rings, unsaturated carbon rings, or combinations of any of these carbon structures. These cyclic olefins can range from very low viscosities, in the case of low molecular weights, to high viscosities in the case of high polymerization of these compounds. These compounds are compatible with polyurethanes without the use of additional compatibilizers, such as ester coupling agents. They can also be polymerized with other non-cyclic, unsaturated compounds to produce a material which is compatible with polyurethanes. One particularly useful compound is Exxon Escopol R-020, a high viscosity reactive polymer made from the Diels-Alder reaction of cyclopentadiene and methyl cyclopentadiene.

The cyclic olefin extenders may also contain an aromatic benzenoid compound. Typical benzenoid compounds include toluene and pyrrole, and these are also compatible with polyurethanes without the use of ester coupling agents. The use of either the cyclic olefin by itself or with the benzenoid compound will inhibit spewing of the extender from the polyurethane composition. These compounds can be utilized in concentrations ranging from about 5 to 95 weight percent of the total extended polyurethane system.

The preferred polyalphaolefins utilized herein as extenders are produced by polymerizing decene-1 to produce trimers, tetramers and pentamers. These compounds are then hydrogenated to eliminate the olefin bond, thereby producing totally saturated hydrocarbons with the generalized formula $C_nH_{2n+2}$ wherein n is between 30 and 50. Commercial polyalphaolefins are available from the Bray Oil Co. under the designation PAOL. Also, Mobil SHF-61, a synthetic hydrocarbon fluid manufactured by polymerization of long-chain alpha olefins and available from Mobil Chemical, and having a specific gravity of 0.825 at 60° F., a viscosity of 30.5 centistokes at 38° C., and a flash point of 450° F., can be used.

The addition of a polyalphaolefin as an extender for polyurethane compositions minimizes the volatility of the composition, thereby providing increased stability to the resulting gel. These compositions have excellent electrical properties, and in particular, good insulating properties as a result of a low dielectric constant and high volume resistivity. Further, exudation of the extender is supressed without affecting the excellent compatibility with the materials employed in the construction of the electrical cable.

Since polyalphaolefins are non-polar, they are thus not completely compatible, by themselves, with polar urethane compounds. For the encapsulation or reclamation of electrical cable, this incompatibility poses a problem, however, polyalphaolefins can be incorporated into systems containing both polar and non-polar components through the use of an ester coupling agent. This combination forms an extended polyurethane which is preferred for sealing electrical cables containing waterproofing greases. The applicable esters may be saturated or unsaturated and may be aliphatic, cycloaliphatic or aromatic. When the need for total compatibility is not present, such as in applications which do not include polar grease constituents, these coupling agents are optional.

The mineral oils which may be used in the preparation of the mineral oil extended polyurethanes include those aliphatic, cycloaliphatic and branched aliphatic saturated hydrocarbons which contain from about 15-30 carbon atoms and which are distilled from petroleum. It has been found preferable, in sealing systems such as those described above utilizing a waterproofing grease, to have the mineral oil include up to about 20% of aromatic carbon atoms so as to reduce the tendency of the mineral oil to migrate toward the grease interface. Further, the cured, mineral oil extended polyurethane has good insulating properties due to its relatively low dielectric constant and high volume resistivity. The composition is characterized by a low volatility, which serves to retard spewing, even at higher extensions, colder temperatures or over long periods of time.

To enhance the compatibility of the mineral oil with the polyurethane, it has been found that a coupling agent should be added to the composition. This agent should be non-reactive with respect to the polyurethane-forming reactants so as not to interfere with the formation of the polyurethane. One skilled in the art would know that coupling agents which satisfy this criterion generally do not contain any labile hydrogen atoms in their structure. As with the polyalphaolefins, liquid ester coupling agents are preferred.

Vegetable oils have also been found to be well-suited for use as polyurethane extenders. The vegetable oils are characterized by low viscosity, low volatility, good electrical properties, high flash point and low pour point, as well as the absence of cracking or stressing tendencies.

Typical vegetable oils which may be utilized include soybean, safflower, corn, sunflower, linseed, oiticica, coconut, cottonseed, perilla, palm, olive, rape seed and peanut oils. In order to generally enhance the compatibility of the vegetable oils with the various urethane components, a cycloaliphatic alcohol may be added to the system in amounts ranging up to about 25% by weight, preferably up to about 5%, of the vegetable oil. Typical alcohols include cyclohexanol, cyclopentanol, cyclobutanol, cyclododecanol, 1,2-cyclohexanediol, cyclohexylmethanol and the like.

When used in the area of reclamation and encapsulation of fiber optic cable, the polyurethanes of the present invention provide excellent performance characteristics. They possess the low viscosities necessary for initial introduction into the cable and the ability to retain these low viscosities for a period of time sufficient to enable them to fill the length of the free spaces in the cable or form a completely encapsulating cover. They also possess the ability to displace and/or repel fluid contaminants and cure in place to form a gel-like urethane structure. This gel structure has sufficient rigidity to provide an excellent protective barrier, yet can be readily cut and removed if re-entry is desired. These polyurethanes are compatible with the conventionally used polymeric materials utilized in cable manufacture. Also, the system is convenient to handle and apply in the field.

In cables which contain a waterproofing grease, specific ester plasticizer compounds may be used instead of, or along with other extender compounds to achieve compatibility of the polyurethane compositions of the invention with the grease. The plasticizer compounds which can be used in this situation include any ester compounds or mixture of ester compounds having a total solubility parameter of between about 8.3 and 8.9 or between about 9.1 and 9.7. Compounds having solubility parameters higher than 9.7 are too volatile for use in gel formulations, while those having solubility parameters less than 8.3 are not compatible with the polyurethane reaction product.

The most suitable plasticizer compounds are esters such as the phthalates, adipates, glutarates, fumarates, sebacates, citrates, trimellitates and the like having between about 4 and 13 carbon atoms, since these compounds possess solubility parameters falling within the above-described critical ranges. Certain ricinoleate compounds such as glyceryl tri (acetyl ricinoleate) and similar compounds which have solubility parameters within the above-disclosed ranges, are also useful and, would be preferred due to their greater compatibility under a wide range of cable fillers or greases which may be encountered in the application of the composition.

In order to provide suitable mechanical and electrical properties for the sealing, i.e. reclamation or encapsulation, of electrical devices within a reasonable period of time at ambient temperature, those polyurethanes extended with mineral oil should be cross-linked. Cross-linking may be obtained by using a polyisocyanate, a polyol, or both having an hydroxyl or NCO functionality greater than 2.

Vegetable oils having total solubility parameters falling within the above-identified range are also useful in the grease compatible formulations of this invention without the need for a compatibilizer or coupling agent. Specific preferred compounds which can be used as plasticizers in accordance with the invention are listed below:

| Compound | Solubility Parameter |
|---|---|
| linseed oil | 8.9 |
| corn oil | 8.9 |
| soybean oil | 8.9 |
| ditridecyl adipate | 8.9 |
| diundecyl phthalate | 9.12 |
| diisodecyl phthalate | 9.15 |
| trioctyl trimellitate | 9.3 |
| glyceryl tri (acetyl ricinoleate) | 9.3 |
| dibutyl phthalate | 9.7 |

Also, one or more of the above-identified plasticizers can be used in combination without departing from the teachings of the invention provided that the overall solubility remains in the desired range.

The solubility parameters of the plasticizer compounds are determined as described in the article entitled "A method for Estimating Both the Solubility Parameters and Molar Volumes of Liquids," by R. F. Fedors, *POLYMER ENGINEERING SCIENCE*, Vol. 14, No. 2, February, 1974, pp. 147–154. This article is expressly incorporated by reference in this application.

As noted in the above-mentioned article, the total solubility parameter for a liquid at 25° C. can be calculated from equation 28 as follows:

$$\gamma = \sqrt{\frac{\sum_i \Delta e_i}{\sum_i \Delta v_i}}$$

where $e_i$ and $v_i$ are the additive atomic and group contribution for the energy of vaporization and molar volume, respectively. Based upon a vast amount of data on simple liquids, these contributions applicable at a temperature of 25° C. have been compiled in Table 5 of the article. Thus, in order to calculate the total solubility parameter for any liquid organic compound, all one need to know is the chemical structure of the compound. Therefore, the term "total solubility parameter" as used in this application is intended to mean the solubility parameter of the compound at 25° C. which is calculated from the experimental energy of vaporization and molar volume values given in Table 5 of the Fedors article. The values which appear in this application are the total solubility parameters for those compounds calculated in the manner previously described.

With respect to the weight change testing, there are different types of greases which may be encountered. The most common is FLEXGEL® cable filler. FLEXGEL® is a registered trademark of the Western Electric Co. Inc. for their cable filling compounds for waterproofing electrical cable. Other cables may have petroleum jelly (PJ) or polyethylene modified petroleum jelly (PEPJ). PEPJ is a higher melting point material than PJ. It should be noted that the ricinoleates have a wider range of compatibility with all types of cable fillers than the other plasticizer compounds.

With respect to the use of these plasticizer compounds in the formulations of the present invention, it should be noted that those compounds having a solubility parameter between about 9.1 and 9.7 provide clear and transparent gels which are preferred for applications where reenterability is of primary importance. Those compounds having solubility parameters between about 8.3 and 8.9 do impart a degree of opaqueness to the resulting gel with the lower values generally providing a higher degree of cloudiness or opaqueness in the gel. However, all the polyurethane gels according to this invention are soft with a low tear strength, and these properties are maintained over time to provide desirable reenterable compounds.

It should further be noted that all the suitable ester components according to the invention are preferably low viscosity liquids at room temperature.

As stated hereinabove, a coupling agent or compatibilizer is not required for the extended polyurethane compositions of the invention, but such coupling agents may optionally be used if desired for specific applications. In the case of the cyclic olefins or mineral oil extenders discussed above, a coupling agent can be used to lower the viscosity, if desired. When used, the coupling agent may range up to about 50 weight percent of the total extended polyurethane. Such compounds are non-reactive or substantially non-reactive with the polyurethane forming components. Any liquid esters, whether saturated or unsaturated, aliphatic, cycloaliphatic, or aromatic aliphatic, may be used for this purpose. Typical esters include phthalates such as 2-ethylhexyl phthalate, and mixtures of n-$C_9$, $C_{10}$, and $C_{11}$ phthalates, adipates such as diisodecyl adipate and n-octyl-n-decyl adipate, glutarates, fumarates, sebacates, citrates, trimellitates and the like, as well as polymeric esters such as Plastolein 9720 from Emery Industries, a plasticizer having an acid value of 3.0, a hydroxyl value of 20, and a viscosity of 207 centistokes at 100° F. to provide a low volatility material having good resistance to oil extraction.

The polyurethane which is used in any of the above identified formulations is generally prepared by reacting approximately stoichiometric amounts of an organic polyisocyanate with the polyol mixture. In a preferred embodiment, the organic polyisocyanate is a polyisocyanate prepolymer which is in turn prepared by reacting an excess of a polyisocyanate compound with the polyol mixture in a manner well known in the art. The polyisocyanate prepolymer is then reacted with the polyol mixture and, optionally, any additional extenders to form the extended polyurethane. In a second embodiment, the organic polyisocyanate is a polyisocyanate compound which directly reacts with the polyol mixture.

The polyurethanes of the invention can also optionally include other extender compounds which can be used with or without a compatibilizer when no polar waterproofing grease is to be encountered. Most oils commercially available for rubber processing may be used for oil extension of the extended polyurethanes of this invention. When used, these extenders can range up to 50 weight percent of the polyurethane. Examples of compounds included in the term processing oils are listed in U.S. Pat. No. 3,107,224, and they can be classified by source into the following groups: petroleum oils and asphalts, petroleum waxes, coal tar oils and pitches, esters, chlorinated hydrocarbons, pine tars and oils, phenols, and resins. All of these commercially available materials are essentially hydrocarbons, that is, at least about 50 weight percent carbon and hydrogen. Preferably, the oil is at least about 75 weight percent, or more preferably, at least about 90 weight percent carbon and hydrogen. As is apparent from the materials listed, the hydrocarbon chains or rings may be interrupted or terminated by non-hydrocarbon groups, for instance, ester, ether, or other oxygen-containing linkages. An example is Drakeol 35, a white mineral oil available from the Penreco Division of the Pennzoil Company, which has a viscosity of betwen 65.3 and 70 centistokes at 40° C., a specific gravity of between 0.865 and 0.882 at 60° F. and a flash point of 435° F.

Usable processing oils are characterized by a viscosity of at least 30 and preferably at least about 70 SSU at 100° F. Petroleum oils are most often used in extending natural and synthetic rubbers as well as the polyurethanes of this invention, and generally are categorized as paraffinic, naphthenic (cycloaliphatic), aromatic, or asphaltic oils. A typical oil is Sundex 790, an aromatic extender oil available from Sun Chemicals, which has a viscosity of 750 centistokes at 100° F., a specific gravity of 0.998 at 60° F., a flash point of 435° F., and contains 37% aromatic carbon atoms, 28% naphthenic carbon atoms, and 35% paraffinic carbon atoms. However, processing oils which combine the characteristics of two or more of these types also may be employed. Viscosities frequently vary from about 100–600 SSU at 100° F. or 35–100 SSU at 210° F. although aromatic and/or asphaltic oils of up to 1000 or 2000 SSU or more at 100° F. are sometimes used.

Coal tar pitch, asphalts, asphaltenes, chlorinated biphenyl ethers, chlorinated waxes, chlorinated oils, rosin esters, certain esters and amides of styrene-maleic anhydride resins, coumarone-indene resins, polybutenes, as well as many other processing compounds may be used, either alone or in conjunction with oils as a further extender. Aromatic and chlorinated oils may also be used as extenders.

Additional extenders composed mainly of hydrocarbons are usually preferred because of their improved hydrolytic properites, oxidative properties, and lower cost. Other extenders include the low molecular weight polybutenes or polyisobutylenes as well as the high boiling fractions of petroleum polymers ordinarily used for lubricants. Chlorinated aromatic and aliphatic hydrocarbons, aromatic ethers, and phosphorus derivatives are particularly advantageous since they may impart some flame retardance to the finished product. The additional extender may comprise up to about 40 weight percent of the extended polyurethane system.

As noted above, these polyurethanes possess the desired properties for a range of applications, with primary emphasis on utilities such as reenterable encapsulants and reclaimants for insulated electrical devices. Initially, these materials are sufficiently fluid to be introduced into the core of a cable or mold surrounding the area of concern and to retain their fluidity for a period of time sufficient to fill all the interior free spaces.

In its reclaiming function, the polyurethane will thus displace the liquid penetrants in the free spaces. Thereafter, a stable gel forms within a reasonable period of time to provide a seal against penetration of water or other fluid materials. Where reenterability is desired, the selected polyurethane provides a gel which is sufficiently soft so as to be readily removed. The presence of a cyclic olefin produces a compatible extended polyurethane system without the use of an ester coupling agent. Due to the reduction or complete elimination of the polar groups present on the ester, the insulating properties of the reenterable encapsulant and reclaimant are highly improved, particularly with regard to the dissipation factor and volume resistivity of the material. Furthermore, there is no exudation of extenders used and there is excellent compatibility with materials employed in the cable construction and with polycarbonate connectors. In addition, the instant extended polyurethanes can be utilized as hard volume (permanent) encapsulants and for general polyurethane elastomeric uses.

The polyurethane gels of the present invention are generally comprised of about 10 to 90 parts by weight of polyurethane, and correspondingly, about 90 to 10 parts by weight of extender. If amounts less than 10% polyurethane are used, the resulting gel will have essentially no tear strength at all, while if less than 10% of plasticizer is used, the resulting formulation will not provide the improved properties. The preferred concentration with particular reference to the reclaiming or encapsulating utility comprises about 20 to 50 and most preferably 30 to 40 parts by weight of polyurethane reaction product, remainder being extender. If harder potting formulations are desired, the relative proportions would be about 90 to 50 parts by weight of polyurethane and about 10 to 50 parts by weight of extender.

Other additives for potting compounds may include inert fillers such as, for example, sands, microballoons, glass fibers, asbestos, aluminum granules, silicon carbide powder and the like, coloring agents, such as pigments and dyes including for example, chromic oxide, ferric oxide, mixtures thereof and the like may be employed in the compositions of the present invention without detracting from the scope thereof.

EXAMPLES

The scope of the invention is further described in connection with the following examples which are set forth for purposes of illustration only and are not to be construed as limiting the scope of the invention in any manner.

The following abbreviations for the compounds of the invention were used in the preparation of the examples in Tables I to III:

| | |
|---|---|
| PBD | Poly-BD R 45 HT |
| BDDR | 1,4 butane diol diricinoleate |
| CHDMDR | 1,4 cyclohexane dimethanol diricinoleate |
| BHPAD | N,N bis (2-hydroxy propyl) aniline diricinoleate |
| EBADR | ethoxylated bisphenol A diricinoleate |
| PE3R | pentaerythritol triricinoleate |
| PE4R | pentaerythritol tetraricinoleate |
| BHPA | N,N bis (2-hydroxy propyl) aniline |
| THEDM | N,N,N,N—tetrakis (2-hydroxy propyl) monoricinoleate |
| THEDD | N,N,N,N—tetrakis (2-hydroxy propyl) diricinoleate |

The following abbreviations are used for prior art commercial PBD modifiers:

| | |
|---|---|
| PPG 425 | 400 MW polypropylene glycol |
| PPG 1025 | 1000 MW polypropylene glycol |
| PPG 2025 | 2000 MW polypropylene glycol |
| Isonol 100 | N,N—bis (2-hydroxypropyl) aniline |
| Quadrol | N,N,N,N—tetrakis (2-hydroxypropyl) ethylene diamine |
| DB Oil | glyceryl triricinoleate |

In the examples that follow, all proportions are listed in parts by weight unless otherwise indicated.

Example 1 uses an hydroxyl terminated polybutadiene (Poly-BD 45HT by Arco Chemical) for the purpose of providing a comparative formulation. This polyol has a molecular weight of about 2800, an equivalent weight of about 1125, a degree of polymerization of about 50, an hydroxyl functionality of about 2.4 to 2.6, an hydroxyl number of 50, an hydroxyl value of 0.89 and an iodine number of 398.

Examples 2 through 8 are comparative examples using PPG 425, 1025, and 2025, Isonol 100, Quadrol and DB Oil, respectively. Isonol 100 is a chain extending diol available from Upjohn, whereas PPG 425, 1025 and 2025 are various molecular weight polypropolylene glycol polyols available from Union Carbide. DB Oil is a mixture of 70% glyceryl triricinoleate 30% glyceryl diricinoleate monoleate or monolinoleate and is available from CasChem, Inc., while Quadrol is available from BASF.

Examples 9 through 26 are mixtures of Poly BD 45HT with a ricinoleate of the invention in the proportion of parts Poly-BD 45HT to parts ricinoleate indicated in Table 1. These mixtures and resultant properties are shown in Tables 1 to 3. The performance properties of Table 3 were obtained from polyurethane compositions of the polyol mixture cured with Desmodur N-100 in an NCO/OH ratio of 1.05/1. However, in accordance with the invention, any NCO/OH ratio between 0.9/1 and 1.8/1 can be used, depending upon the desired composition.

TABLE 1

| | Physical Properties | | | |
|---|---|---|---|---|
| Example | PBD/Polyol Mixture | Viscosity (cps) | Hydroxyl Number | Equivalent Weight |
| 1 | PBD: 100/0 | 8000 | 50 | 1125 |
| 2 | PPG 425: 70/30 | 2575 | 114 | 493 |
| 3 | PPG 1025: 50/50 | 1425 | 78.5 | 715 |
| 4 | PPG 2025: 50/50 | 1875 | 53 | 1057 |
| 5 | Isonol 100: 80/20 | 8500 | 147 | 380 |
| 6 | Quadrol: 85/15 | 8100 | 158 | 355 |
| 7 | DB Oil: 80/20 | 5500 | 73 | 770 |
| 8 | DB Oil: 75/25 | 4900 | 75 | 750 |
| 9 | BDDR: 80/20 | 4300 | 73 | 770 |
| 10 | BDDR: 70/30 | 3300 | 84.5 | 665 |
| 11 | BDDR: 45/55 | 1500 | 113 | 495 |
| 12 | CHDMDR: 80/20 | 5000 | 69 | 815 |
| 13 | CHDMDR: 60/40 | 3300 | 88 | 638 |
| 14 | CHDMDR: 45/55 | 2400 | 102 | 550 |
| 15 | BHPAD: 80/20 | 4400 | 70 | 805 |
| 16 | BHPAD: 60/40 | 2800 | 90 | 625 |
| 17 | BHPAD: 50/50 | 2200 | 99.5 | 565 |
| 18 | BHPAD: 40/60 | 1750 | 109.5 | 512 |
| 19 | EBADR: 90/10 | 7000 | 57 | 990 |
| 20 | EBADR: 80/20 | 5900 | 63.5 | 880 |
| 21 | PE3R: 90/10 | 7500 | 65.5 | 860 |
| 22 | PE3R: 80/20 | 6900 | 81 | 695 |
| 23 | PE4R: 75/25 | 5600 | 76.5 | 735 |
| 24 | PE4R: 70/30 | 5550 | 78 | 730 |
| 25 | THEDM: 75/25 | 6750 | 131 | 428 |
| 26 | THEDD: 65/35 | 3750 | 124 | 452 |

TABLE 2

| | Performance Properties | | |
|---|---|---|---|
| Example | Tensile Strength (PSI) | Elongation (%) | Tear Strength (PLI) |
| 1 | 140 | 65 | 15 |
| 2 | 215 | 70 | 27 |
| 3 | 96 | 75 | 17 |
| 4 | 85 | 85 | 13 |
| 5 | 375 | 45 | 48 |
| 6 | 400 | 40 | 30 |
| 7 | 160 | 50 | 16 |
| 8 | 102 | 85 | 20 |
| 9 | 160 | 80 | 17 |
| 10 | 200 | 95 | 20 |
| 11 | 270 | 100 | 20 |
| 12 | 155 | 85 | 20 |
| 13 | 180 | 80 | 20 |
| 14 | 215 | 90 | 20 |
| 15 | 215 | 90 | 23 |
| 16 | 225 | 105 | 31 |
| 17 | 280 | 125 | 34 |
| 18 | 215 | 110 | 31 |
| 19 | 160 | 60 | 17 |
| 20 | 175 | 50 | 19 |
| 21 | 190 | 55 | 18 |
| 22 | 210 | 50 | 20 |
| 23 | 145 | 50 | 15 |
| 24 | 198 | 70 | 28 |
| 25 | 350 | 50 | 28 |
| 26 | 395 | 65 | 26 |

TABLE 3

| | Electrical Properties | | |
|---|---|---|---|
| Example | Dielectric Constant (KHz) | Dissipation Factor (KHz) | Volume Resistivity ($10^{13}$ ohm-cm) |
| 1 | 3.6 | 0.04 | 9 |
| 2 | 4.0 | 0.09 | 0.8 |
| 3 | 5.5 | 0.03 | 0.04 |
| 4 | 4.7 | 0.02 | 0.06 |
| 5 | 3.1 | 0.05 | 50 |
| 6 | 3.4 | 0.05 | 20 |
| 7 | 4.2 | 0.05 | 3 |
| 8 | 3.5 | 0.02 | 12 |
| 9 | 4.1 | 0.03 | 2 |
| 10 | 4.7 | 0.06 | 1 |
| 11 | 5.4 | 0.09 | 0.9 |
| 12 | 4.2 | 0.06 | 6 |
| 13 | 4.5 | 0.11 | 6 |
| 14 | 4.9 | 0.12 | 4 |
| 15 | 4.1 | 0.06 | 5 |
| 16 | 4.5 | 0.09 | 3 |
| 17 | 4.6 | 0.12 | 3 |
| 18 | 4.5 | 0.14 | 5 |
| 19 | 3.8 | 0.04 | 7 |
| 20 | 4.0 | 0.05 | 6 |
| 21 | 3.7 | 0.06 | 10 |

TABLE 3-continued

| | Electrical Properties | | |
|---|---|---|---|
| Example | Dielectric Constant (KHz) | Dissipation Factor (KHz) | Volume Resistivity ($10^{13}$ ohm-cm) |
| 22 | 3.8 | 0.07 | 11 |
| 23 | 4.0 | 0.05 | 2 |
| 24 | 3.8 | 0.06 | 12 |
| 25 | 3.5 | 0.07 | 10 |
| 26 | 4.0 | 0.10 | 2 |

The results show that the ricinoleate modified hydrocarbon polymer polyols provide substantial improvements over unmodified hydrocarbon polymer polyols or non-ricinoleate/polyol mixtures, particularly with regard to viscosity, physical and electrical properties.

EXAMPLE 27

This Example is an illustration of a general purpose polyurethane composition having good moisture, chemical and weathering resistance, as well as being a soft reenterable gel which can easily be removed, if necessary, for access to any mechanical or electrical components which are encapsulated or coated by the composition. One application of this composition is the encapsulation of electrical circuitry or microprocessing means which will be exposed to outdoor weather conditions or similar environments, such as is the case when these components are installed in automobile engines or for use with outdoor signs, lighting or the like.

A casting composition was prepared as follows:

| | Parts | Weight Percent |
|---|---|---|
| Component A | | |
| isocyanate (1) | 140 | 31 |
| hydrocarbon polyol (2) | 75 | 16 |
| diisodecyl phthalate | 240 | 53 |
| | 455 | 100 |
| Component B | | |
| 1-4 BDDR | 293 | 71 |
| castor oil | 52 | 13 |
| diisodecyl phthalate | 70 | 16 |
| | 370 | 100 |

Notes:
(1) Papi 901 from Union Carbide
(2) Poly BD R45 HT from Arco Chemicals

Equal amounts of component A and B were reacted and allowed to cure. This polyurethane was found to possess following properties:

| Property | Example 27 |
|---|---|
| Peak Stress (psi) | 55 |
| Break Strain (%) | 150 |
| Modulus (PSI) | 41 |
| Tear Strength (PLI) | 7 |
| Hardness (Shore A/00) | 12/45 |
| Dielectric Constant | 4.9 |
| Dissipation Factor ($\times 10^{-3}$) | 72 |
| Volume Resistivity ($\times 10^{13}$ ohm-cm) | 1.2 |

To determine chemical resistance, the formulation was cured and then immersed into various chemicals. After a period of one week, the percent change of certain properties of the cured formulation was measured, and the results are shown below:

| Solvent | % volume change | % weight change | % hardness change |
|---|---|---|---|
| gasoline | +42.13 | +26.44 | −30/−5 |
| motor oil | −3.18 | −1.74 | +10/+5 |
| 5% salt solution | 0.00 | +0.18 | +5/+2.1 |
| water | +0.00 | +0.18 | +5/+2.1 |
| windshield washer | +0.00 | +1.20 | +5/+2.1 |
| brake fluid | +22.44 | +26.45 | −30/−7.8 |
| antifreeze | +0.50 | +0.35 | −5/+5 |
| engine cleaner | +68.20 | +54.63 | −45/−8.5 |
| ethylene glycol | +0.95 | +0.21 | +15/+4 |

When used in the area of reclamation or encapsulation, the polyurethane compositions of the invention give excellent performance characteristics. They possess the low viscosities necessary for initial introduction into the cable and the ability to retain these low viscosities for a period of time sufficient to enable it to fill the length of the free spaces in the cable or form a complete encapsulating cover. They also possess the ability to displace and/or repel fluid contaminants and cure in place to form a gel-like urethane structure which neither spews forth nor exudes the cyclic olefin. The gel structure is of sufficient rigidity to provide an excellent protective barrier, yet can be readily cut and removed if re-entry is desired. The polyurethane is non-corrosive to copper wire and compatible with the conventionally used polycarbonate connectors and other polymeric materials utilized in cable manufacture. The system is also convenient to handle and apply in the field.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A polyol mixture comprising from about 10 to 60 weight percent of at least one ricinoleate compound having at least two hydroxyl groups per molecule and from about 90 to 40 weight percent of a $C_2$ to $C_6$ hydrocarbon polymer having at least one hydroxyl group.

2. The mixture of claim 1 wherein the hydrocarbon polymer comprises polybutadiene.

3. The mixture of claim 1 wherein the ricinoleate compound is a diricinoleate of an aliphatic diol of between about 2 and 12 carbon atoms, a cycloaliphatic diol, or aromatic diol.

4. The mixture of claim 1 wherein the ricinoleate compound is pentaerythritol triricinoleate; pentaerythritol tetraricinoleate; or a diricinoleate of N,N,N,N-tetrakis (2-hydroxy propyl) ethylene diamine, N,N-bis-(2 hydroxy propyl) aniline; 1, 4 cyclohexane dimethanol; ethylene glycol; diethylene glycol; ethoxylated bisphenol A; 1,4 butanediol; 1,3 propanediol; 1,6 hexane diol; and 1,3 neopentyl glycol; or N,N,N,N-tetrakis-(2-hydroxy propyl) ethylene diamine monoricinoleate.

5. The mixture of claim 1 wherein the ricinoleate compound is present in an amount between 20 and 40 weight percent and said hydrocarbon polymer comprises between about 80 and 60 weight percent.

6. A polyurethane composition comprising the reaction prouct of a polyol mixture with an organic isocyanate compound, said polyol mixture comprising from about 10 to 60 weight percent of at least one ricinoleate compound having at least two hydroxyl groups per molecule and from about 90 to 40 weight percent of a $C_2$ to $C_6$ hydrocarbon polymer having at least one hydroxyl group.

7. The composition of claim 6 wherein the ratio of NCO groups in the isocyanate compound to the OH groups of the polyol mixture ranges from about 0.9 to 1.8.

8. The composition of claim 6 wherein the ricinoleate compound is a diricinoleate of an aliphatic diol of between about 2 and 12 carbon atoms, a cycloaliphatic diol, or an aromatic diol.

9. The composition of claim 6 wherein the ricinoleate compound is pentaerythritol triricinoleate; pentaerythritol tetraricinoleate; or a diricinoleate of N,N,N,N-tetrakis (2-hydroxy propyl) ethylene diamine; N,N-bis-(2 hydroxy propyl) aniline; 1,4 cyclohexane dimethanol; ethylene glycol; diethylene glycol; ethoxylated bisphenol A; 1,4 butanediol; 1,3 propanediol; 1,6 hexane diol; and 1,3 neopentyl glycol; or N,N,N,N-tetrakis-(2-hydroxypropyl) ethylene diamine monoricinoleate.

10. The composition of claim 6 wherein the ricinoleate compound is present in an amount between 20 and 40 weight percent and said hydrocarbon polymer comprises between about 80 and 60 weight percent.

11. The composition of claim 6 wherein the organic isocyanate compound is an aliphatic, cycloaliphatic or aromatic polyisocyanate.

12. The composition of claim 6 wherein the hydrocarbon polymer comprises polybutadiene.

13. The composition of claim 6 further comprising an extender compound.

14. An extended polyurethane composition comprising the reaction product of a polyol mixture and an organic isocyanate compound in the presence of an extender compound which is substantially non-reactive with the polyol mixture or isocyanate compounds, said polyol mixture comprising from about 10 to 60 weight percent of at least one ricinoleate compound having at least two hydroxyl groups per molecule and from about 90 to 40 weight percent of a $C_2$ to $C_6$ hydrocarbon polymer having at least one hydroxyl group.

15. The composition of claim 14 wherein the reaction product is present in an amount of about 10 to 90 weight percent and the extender compound is present in an amount of between 90 and 10 weight percent.

16. The composition of claim 14 wherein said extender is a liquid ester compound; a liquid cyclic olefin; a polyalphaolefin; a mineral oil; a vegetable oil; or mixtures thereof.

17. The composition of claim 16 wherein the ester compound is an adipate, phthalate, glutarate, sebacate, fumarate, ricinoleate or trimellitate ester.

18. The composition of claim 14 wherein the extender is a liquid ester or vegetable oil having a total solubility parameter of between about 9.1 and 9.7 or between about 8.3 and 8.9.

19. The composition of claim 18 wherein the ester compound is glyceryl tri (acetyl ricinoleate), linseed oil, corn oil, trioctyl trimellitate, soybean oil, ditridecyl adipate, diundecyl phthalate, diisodecyl phthalate, or dibutyl phthalate.

20. The composition of claim 15 wherein the extender compound is present in an amount of between about 50 and 80 weight percent with the reaction product present in an amount of between about 20 and 50 weight percent.

21. The composition of claim 14 wherein the isocyanate compound is polymethylene polyphenyldiisocyanate or p,p' diphenyl methylene diisocyanate.

22. The composition of claim 21 wherein the ratio of NCO groups in the isocyanate compound to the OH groups of the polyol mixture ranges from about 0.9 to 1.8.

23. The composition of claim 14 wherein the ricinoleate compound is pentaerythritol triricinoleate; pentaerythritol tetraricinoleate; or a diricinoleate of N,N,N,N-tetrakis (2-hydroxy propyl) ethylene diamine; N,N bis-(2 hydroxy propyl) aniline; 1,4 cyclo hexane dimethanol; ethylene glycol; diethylene glycol; ethoxylated bisphenol A; 1,4 butanediol; 1,3 propanediol; 1,6 hexane diol; and 1,3 neopentyl glycol; or N,N,N,N-tetrakis (2-hydroxypropyl) ethylene diamine monoricinoleate.

24. The composition of claim 14 wherein the hydrocarbon polymer comprises polybutadiene.

25. A method for lowering the viscosity of a $C_2$–$C_6$ hydrocarbon polymer having at least one hydroxyl group while increasing the mechnaical properties of compositions utilizing said polymer, which comprises adding to said polymer at least one ricinoleate compound having at least two hydroxyl groups per molecule to form a low viscosity polyol mixture.

26. The method of claim 25 wherein the mixture comprises between about 10 and 60 weight percent ricinoleate compound and between about 90 and 40 weight percent hydrocarbon polymer.

27. The method of claim 25 which further comprises processing the polyol mixture to form a coating, casting or potting formulation.

28. The method of claim 25 which further comprises reacting the polyol mixture with an isocyanate compound to form a polyurethane composition.

29. The method of claim 28 which further comprises adding an extender compound which is substantially non-reactive with the polyol mixture and isocyanate compound in an amount of between about 50 and 80 weight percent with the polyurethane composition amounting to between about 20 and 50 weight percent.

30. The method of claim 25 wherein the ricinoleated compound is a polyricinoleate compound.

31. The method of claim 25 wherein the ricinoleate compound is a di-, tri- or tetra-ricinoleate compound.

32. The mixture of claim 25 wherein the ricinoleate compound is a di-, tri- or tetra-ricinoleate of a diol.

33. A polyol mixture comprising from about 10 to 60 weight percent of at least one polyricinoleate compound having at least two hydroxyl groups per molecule and from about 90 to 40 weight percent of a $C_2$ to $C_6$ hydrocarbon polymer having at least one hydroxy group.

34. The polyol mixture of claim 33 wherein the polyricinoleate compound is a di-, tri- or tetra-ricinoleate compound.

35. The polyol mixture of claim 33 wherein the polyricinoleate compound is a di-, tri- or tetra-ricinoleate of a diol.

36. An extended polyurethane composition comprising between about 20 and 50 weight percent of the reaction product of a polyol mixture and an organic isocyanate compound in the presence of between about 80 and 50 weight percent of an extender compound comprising a liquid ester compound; a liquid cyclic olefin; a polyalphaolefin; a mineral oil; a vegetable oil; or mixtures thereof; said extender compound being substantially non-reactive with the polyol mixture or isocyanate compounds, said polyol mixture comprising from about 10 to 60 weight percent of at least one ricinoleate compound having at least two hydroxyl groups per molecule and from about 90 to 40 weight percent of a $C_2$ to $C_6$ hydrocarbon polymer having at least one hydroxyl group.

* * * * *